Figure 3:
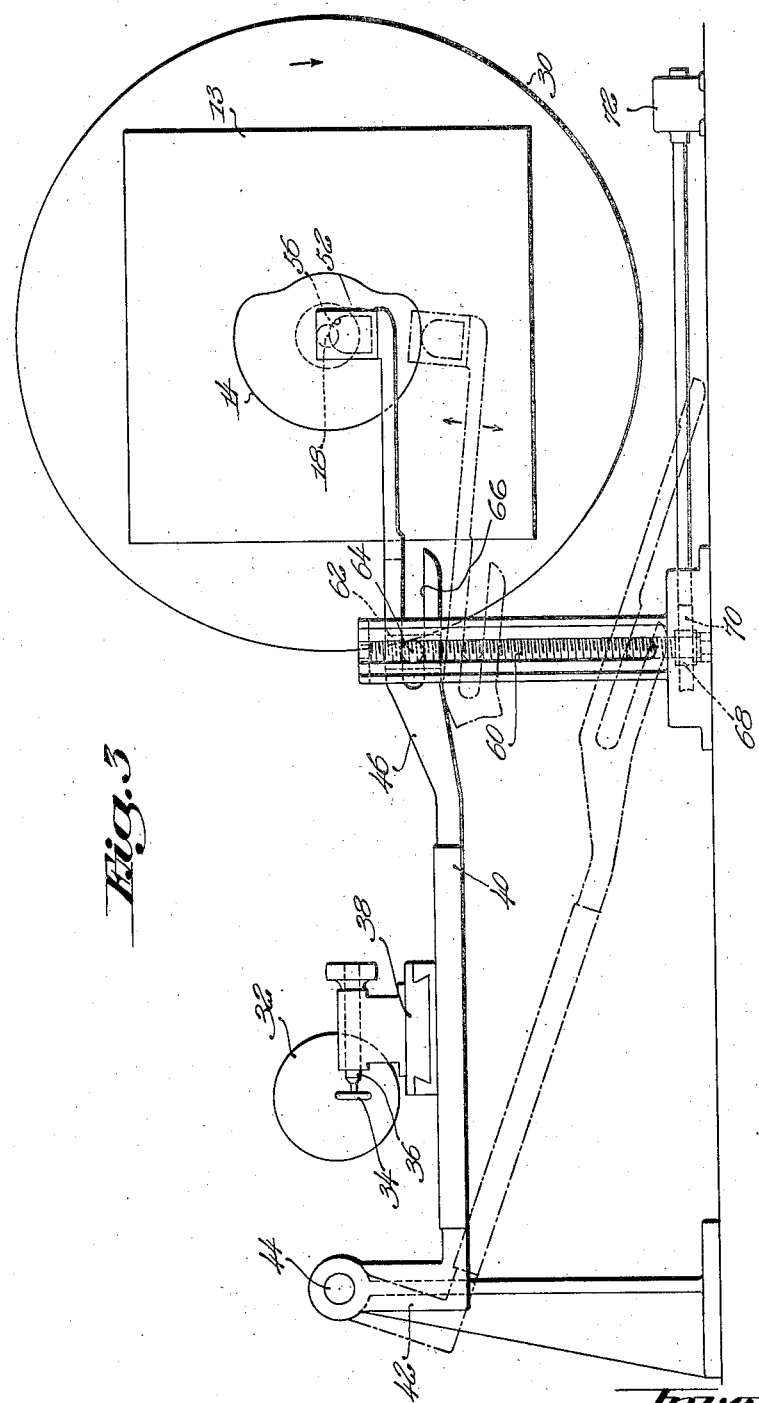

Sept. 17, 1946.    M. KNOBEL    2,407,886
TRACKING APPARATUS
Filed March 31, 1944    4 Sheets-Sheet 1
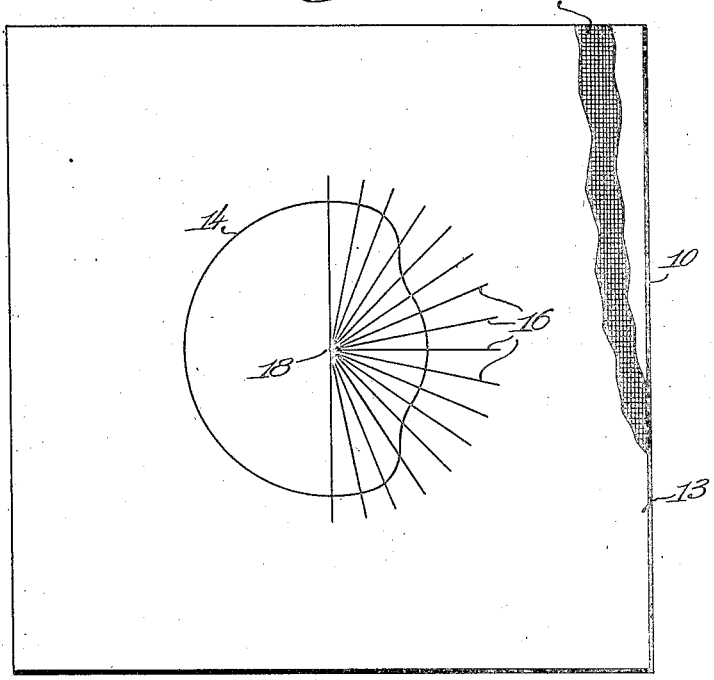
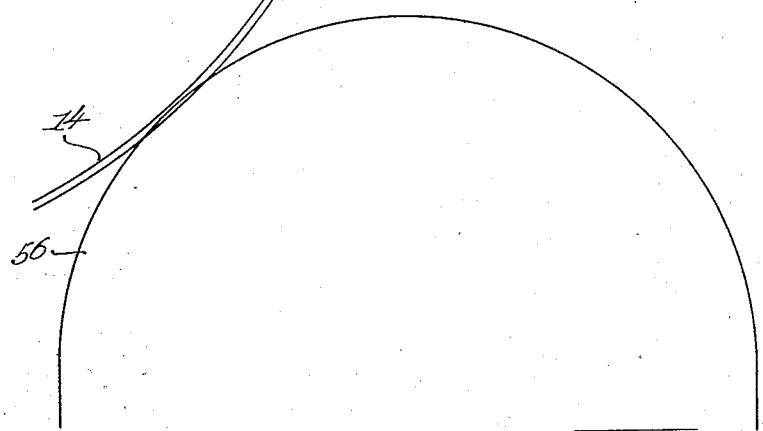

Sept. 17, 1946.  M. KNOBEL  2,407,886
TRACKING APPARATUS
Filed March 31, 1944  4 Sheets-Sheet 2

Witness
Frederick S. Greenleaf

Inventor
Max Knobel
by his attorneys
Churchill & Jenney

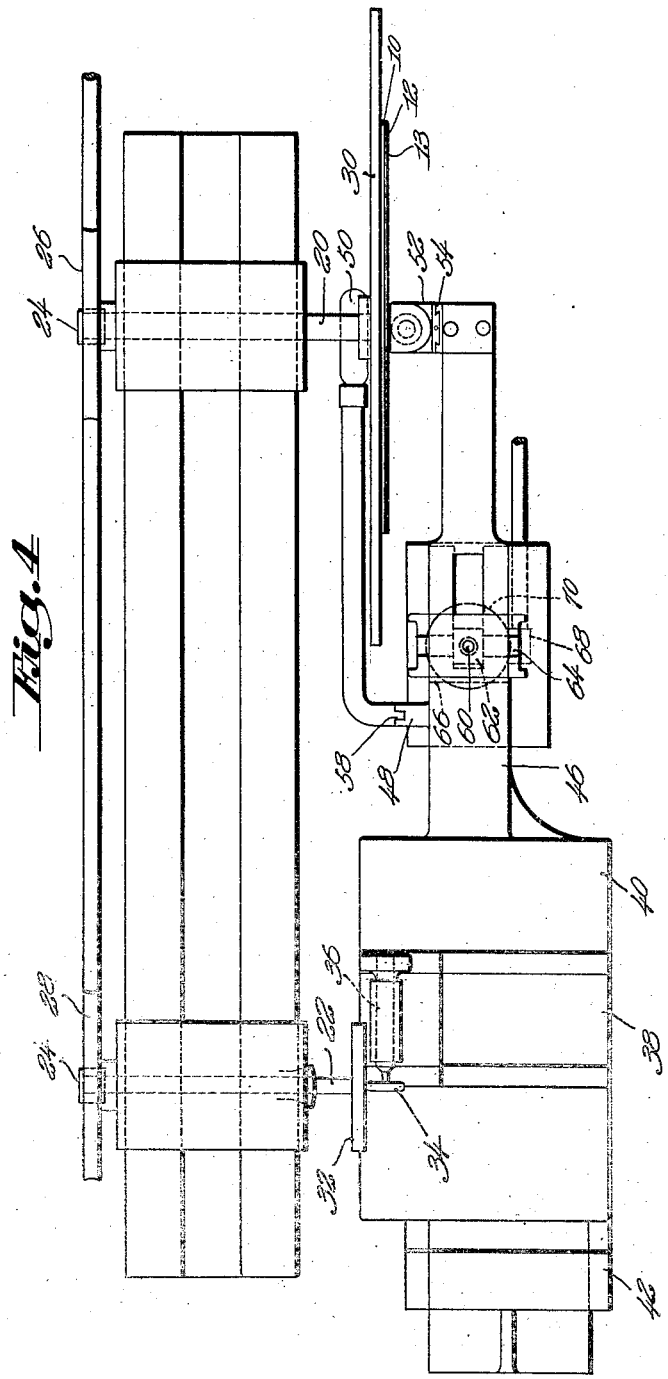

Sept. 17, 1946.    M. KNOBEL    2,407,886
TRACKING APPARATUS
Filed March 31, 1944    4 Sheets-Sheet 4
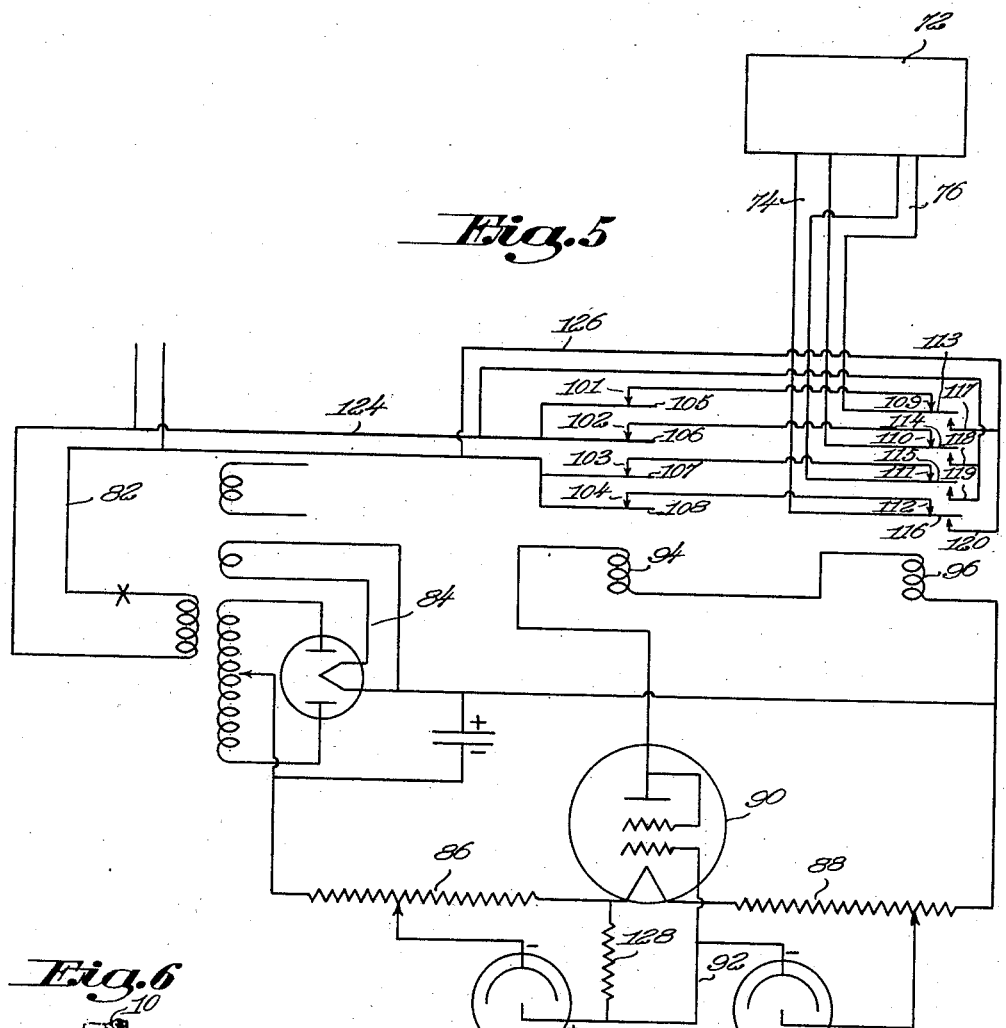
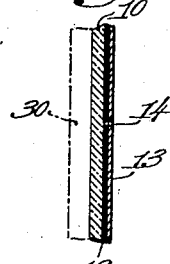

Patented Sept. 17, 1946

2,407,886

UNITED STATES PATENT OFFICE 2,407,886

TRACKING APPARATUS

Max Knobel, Arlington, Mass.

Application March 31, 1944, Serial No. 529,000

5 Claims. (Cl. 90—13.7)

The present invention relates to tracking apparatus.

It has been proposed to use devices for tracking a contour determined by a template or a drawing for the purpose of making reproductions, controlling the operation of a cutting or welding torch, or the like. The following of the contour may be accomplished optically under the control of an operator, and in some instances automatic following under photoelectric control has been suggested. While these devices have been practical in some instances, they have not been sufficiently precise for many types of work. For example, the formation of a drawing or template is usually an inaccurate operation. Devices to follow an inked curve may not be satisfactory because of variations in the width of the line or uncertain reflections from portions of the sheet.

The object of the present invention is to provide tracking apparatus of high precision, useful for controlling the operation of a tool, drawing instrument or other output device.

With this object in view, one of the features of the present invention comprises a master pattern or drawing, the outline of which is made by scratching a fine line in an opaque coating on a transparent sheet. This pattern is used in conjunction with apparatus operating on the passage of light through the line whereby the control of position may be obtained to within a fraction of the width of the line. Preferably, the master drawing will be on a large scale with relation to the work, so that the control may be exercised to a high degree of accuracy.

The invention contemplates the use of such a drawing or pattern for control of a machine tool or other instrument whereby the relation of the tool with respect to the work may be accurately controlled, in which case the tracking device has an aperture shaped exactly like the profile of the tool, although preferably on a larger scale, and the tool and pattern are mounted in such a way that the tracking device acts with relation to the pattern in the same manner as a mechanical follower on a physical pattern or cam.

In the preferred form of the invention, the tracking of the contour is accomplished automatically, by means under the control of photoelectric devices.

Other features of the invention consist in certain novel features of construction and combinations and arrangements of parts hereinafter described and particularly defined in the claims.

In the accompanying drawings, Fig. 1 is a view of the preferred form of pattern or drawing; Fig. 2 is a detail view illustrating the tracking operation; Fig. 3 is an elevation of a milling machine in which the tool operation is controlled according to the present invention; Fig. 4 is a plan view of the machine shown in Fig. 3; Fig. 5 is a circuit diagram; Fig. 6 is a sectional view of the pattern; and Figs. 7 and 8 are detail views of a modified form of the invention for optical tracking.

According to the preferred form of the present invention, the drawing or pattern comprises a sheet 10 of transparent plastic material such as Celluloid, to which is applied an opaque coating. Preferably this coating is in two layers, comprising first a black layer 12 covered by a white external layer 13. The black coating provides opacity against transmission of light, and the white coating forms a surface on which the draftsman may draw the desired pattern. The paint is of a type having a solvent which will "bite" into the plastic to prevent scaling. As shown in Fig. 1, the heavy line 14 consists of the outline of a cam figure, which for purposes of illustration is taken as a pattern to control the operation of the machine tool to be hereinafter described. In addition to the line 14, other lines 16 appear on the drawing. These are construction lines used by the draftsman to facilitate construction of the figure. After the drawing is laid out, the line 14 is scratched with a fine stylus. Undesired holes or scratches made by the compass or otherwise may be covered with black paint. It has been found that a line about .002" in width can easily be scratched through the coating layers, and that this line will have substantial uniformity of width. In view of the fact that the control is exercised by passage of light through the scratched line 14, it is unnecessary to erase the construction lines 16. A center spot may appear as indicated at 18.

The pattern 10 as thus drawn is then mounted on the machine shown by way of example in Figs. 3 and 4. This machine may be a milling, grinding, broaching or shaping machine, but is here illustrated as a milling machine which is automatically controlled to operate a milling cutter in accordance with the pattern of line 14. The machine comprises a pattern arbor 20 and a work arbor 22, both rotated slowly and in unison by worms 24 and worm gears 26, 28. The pattern arbor 20 carries a glass plate 30, to which the pattern 10 is attached in any suitable manner, with its center at the axis of the shaft 20. The work, here indicated as a disk 32 of metal, is chucked or otherwise supported concentric with the work arbor 22.

It will be understood that the term "work," as herein used, may comprise a piece of stock to be operated upon by a machine tool, or a drawing or etching, or any member or article to be controlled in outline in accordance with the design 14 on the pattern 10. For purposes of illustration it is assumed that a figure of the cam shape 14 (but of smaller size than the pattern) is to be milled out of the disk 32. To this end, a milling cutter 34 is provided and is mounted on an arbor 36 suitably supported with relation to a reciprocating slide 38. A suitable motor, not shown, is used to drive the cutter.

The entire tool assembly is mounted on a platform 40, having an extension 42 mounted for pivotal movements on a fixed shaft 44, the center of which is in line with the centers of the shafts 20 and 22. The platform 40 has a bracket 46 extending in front of the plate 30 and also a bracket 48 extending in back of the plate 30 and carrying at its end a lamp 50.

The front bracket 46 carries at its end a casing 52 enclosing photoelectric apparatus to be later described. This casing is adjustable with relation to the bracket 46, as indicated at 54. The part of the casing adjacent to the pattern 10 is formed with an aperture 56 of exactly the same shape as the profile of the cutter 34 but on an enlarged scale, the scale factor being the ratio of distances from the axes of the respective shafts 20 and 22 to the axis of the shaft 44.

The lamp bracket 48 is provided with a breakback joint 58 to prevent damage to the lamp if the photoelectric apparatus is brought toward the center of the pattern.

In operation the aperture 56 is caused to follow the curve 14, by means to be described presently, thereby causing the cutter 34 to enter the work 32 to a corresponding extent. As shown in Fig. 2, which shows the scratch 14 on an enlarged scale, the control devices adjust the aperture 56 to pass a certain definite amount of light from the lamp through the scratch and aperture to the photoelectric cell. If at any instant the aperture is too close to the center, the excess of light falling on the cell causes the aperture to be retracted from the center, and if no light or insufficient light falls on the cell, the device is automatically moved toward the center. The accuracy of control may be appreciated when it is understood that the width of the scratch need not be more than .002″, and that the aperture will adjust to within a fraction of that width. If the scale factor is five or more, as indicated in the drawing, the accuracy of control is exceptional.

The means whereby the aperture is caused to follow the line will now be described. An elevating screw 60 is arranged to raise or lower the nut 62, having a pin 64 movable in a slot 66 in the arm 46, whereby the arm may be moved through the range between the dot-and-dash line position and the full line position in Fig. 3. (An intermediate position shown in dotted lines indicates the window 56 tangent to the curve 14.) The elevating screw is capable of being rotated by a worm 68 and worm gear 70, the worm being driven by an elevating motor 72. The elevating motor may be driven in either direction, as called for by the amount of light falling on the photoelectric cell. The operation of the elevating motor is effected by the servo-mechanism, of which the circuit diagram is shown in Fig. 5.

The servo-mechanism includes the reversible elevating motor 72 which may be of the split-phase type, having two pairs of leads 74, 76 for the two windings. Energization of the motor is under the control of two photoelectric cells 78 and 80, of which the latter is arranged to pick up the light coming through the scratch in the drawing. The cell 78 is arranged in the casing 52 so that both cells pick up the same amount of stray light. The cells are arranged in a circuit of well-known type which operates in such a way that stray light effects are balanced out, and which also has extremely sensitive characteristics. The circuit will be described briefly.

It comprises the alternating current supply 82 leading through a full wave rectifier circuit 84 of conventional form to the cells 80 and 78 in series. Across the cells is a drop wire consisting of resistors 86 and 88 with the filament of an amplifier tube 90 connected between them. The negative terminal of cell 78 taps into resistor 86 and the positive terminal of the cell 80 taps into resistor 88. The negative terminal of cell 80 is connected to the positive terminal of cell 78 by a connection 92 and the junction is connected to the control grid of the tube 90.

The anode circuit of the amplifier 90 is connected to the coils of two relays in series, the relays being indicated at 94 and 96. Relay 94 has four movable contacts designated 101 to 104 closed on fixed contacts 105 to 108 respectively when the current in relay 94 is insufficient to attract the relay armature. The fixed contacts 105 to 108 are connected respectively to fixed contacts 109 to 112 of the relay 96, which has movable contacts 113 to 116, likewise closed on the said fixed contacts when the relay 96 carries insufficient current to attract its armature. Back contacts 117 to 120 are also associated with the respective movable contacts of the relay 96.

The line connects through leads 124 with contacts 101, 102 and 103, 104 of relay 94, and through leads 126 with back contacts 118, 119 and 117, 120 of the relay 96. The motor leads 74 are connected to movable contacts 110, 112 and leads 76 are connected to contacts 109, 111.

When the current is insufficient to attract the armatures of the relays, the elevating motor is energized in the direction to raise the platform. At some particular value of plate current of the amplifier 90, the armature of relay 94 is attracted, thereby opening the circuit of the motor, the relay 96 not being energized sufficiently to attract its armature at this value of current. The relay 96 is designed so that upon a slight further increase of current, its armature will be attracted, thereby closing the movable contacts on the back contacts. The motor then starts, but in the reverse direction since the leads 76 are now reversed. The platform is now retracted until the aperture overlies the scratch, as indicated in Fig. 2. The result is that the aperture is always positioned in proper relation, tangent to the scratch, except for deviations arising from the on-and-off operation of the motor.

The magnitude of these deviations is determined by the sensitivity of the circuit involving the cells 78 and 80. The circuit herein shown is extremely sensitive, hence the deviations will be negligible; in fact the circuit is more sensitive than is necessary. In order to prevent excessive operation of the relays, it may be desirable to reduce the sensitivity, and this can be done by connecting a resistor 128 between the control grid and the filament of the tube 90.

In making the initial setting, it is necessary to center both the pattern and the work accurately. To center the pattern, the elevating motor is raised so that the center 18 can be sighted through the aperture 56. Any necessary adjustments of the casing 52 on the arm 46 can then be made, the tool 34 being also centered with respect to the work. At this time the photoelectric control cannot be conveniently used, because the shaft 20 would interfere with the lamp 50, which, as heretofore mentioned, is mounted in an arm having a break-back joint 58 to prevent damage to the lamp.

After the initial setting, the arm 46 is then backed away so that the tool is in proper starting relation to the periphery of the work. In these preliminary operations of the arm 46, the elevating motor may be controlled by operating the relay armatures manually.

For the actual machining operations, the slow drive 26, 28 is operated, and the motors for controlling the rotation and traverse of the milling cutter are started. It will be understood that the drive 26, 28 is sufficiently slow so that the rotation of the pattern and work is negligible during any single traverse. For this reason the invention as herein shown is particularly useful for the manufacture of dies, master cams, and similar pieces of equipment wherein speed of operation is not essential. It will be understood that the work and pattern arbors may be indexed by small steps in any desired manner instead of by the continuous drive herein shown.

In some machining operations, it may be necessary to take one or more rough cuts before the final cut. Rough cuts may be most conveniently controlled by adjusting the casing 52 with relation to the arm 46. Thus, for an initial rough cut, the casing 52 is raised somewhat on the arm 46. The aperture 56 will then follow the contour, but the tool will not cut into the work up to the finish contour. One or more rough cuts may be taken, as desired, after which the casing may be accurately adjusted with relation to the pattern for the finish cut.

Although the invention has been described as embodied in a machine for controlling the operation of a milling cutter, it will be understood that it may be used for any machine tool or other mechanical operation, as, for example, broaching, torch cutting, reproduction of drawings, and in fact any other operation in which control is required in accordance with an accurately constructed contour. The term "instrument" is used in the claims to refer to any device for operating on the work. For machine tool operations wherein the aperture is shaped exactly like the profile of the tool (taking proper account of scale), the aperture will partly overlie the scratch and conform thereto, regardless of the direction of the curve. In any case, the profile will be tangent to the curve and therefore conform exactly to the relation of the tool against the work.

The invention has thus far been described as embodied in a complete system for automatic operation wherein the motions of the tool with relation to the work are controlled automatically through the medium of light passed through a scratch and falling on the photoelectric cell. It will be understood, however, that this automatic operation is not an essential of all features of the invention, and that the same precision of control may be attained optically by an operator. This is illustrated by Fig. 7, in which a black plate member 122 is substituted for the casing 52, this member having the same shape as the tool but enlarged in accordance with the scale factor, exactly like the aperture 56. The operator sees a fine line of light transmitted through the scratch in the master pattern, and he operates the screw 60 so that the member 122 is always tangent to the line. Moderate optical magnification is desirable and is conveniently afforded by a simple lens 124. For the actual operation of the elevating screw, the motor 72 and its control circuits are preferably omitted and the worm 68 is operated by a suitable hand-crank.

One of the most important features of the invention is the pattern or drawing which is laid out on a transparent plastic sheet. An advantage of this material is that the design may be laid out with much greater accuracy than on paper. It is well known that layouts with compass and dividers on paper are subject to some deviation, because of the stretch of the paper under the pressure necessarily exerted at the compass points. With a sheet of plastic as herein described, no such difficulties exist, and the layout may be made with extreme precision. Furthermore, as heretofore noted, the presence of construction lines does not interfere with automatic control operations, because only the desired outline is scratched through the painted surface.

Having thus described my invention, I claim:

1. Tracking apparatus comprising a pattern having a narrow light-transmitting line scratched in an opaque coating on a transparent sheet, a movable member having an aperture through which the line is sighted, a work support, an instrument for operating on the work, the aperture being of the same shape as the operating part of said instrument but of different size according to a scale factor, a pivoted rigid connection between said member and said instrument whereby they are moved with relation to the pattern and the work, respectively, at rates depending on the scale factor.

2. Tracking apparatus comprising a pattern having an opaque field and a drawing in the form of a narrow light-transmitting line in said field, a movable follower member having an aperture through which the line is sighted, a work support, a cutting tool for operating on the work, a pivoted rigid member carrying the cutting tool and the follower member, the tool and follower being at different distances from the pivot according to a scale factor, photo-electric means carried by said follower, and means controlled by the photo-electric means to move the rigid member about its pivot into a position in which a predetermined amount of light transmitted through said line falls on the photoelectric means and thereby to move the cutting tool in similar relation to the work.

3. Tracking apparatus comprising a pattern having an opaque field and a drawing in the form of a narrow light-transmitting line in said field, a movable follower member having an aperture through which the line is sighted, a work support, a cutting tool for operating on the work, a pivoted rigid member carrying the cutting tool and the follower member, the tool and follower being at different distances from the pivot according to a scale factor, means for rotating the work and the pattern about independent axes in unison, photoelectric means carried by said follower, and means controlled by the photoelectric means to move the rigid member about its pivot into a position in which a predetermined amount of light transmitted through said line falls on the photoelectric means and thereby to move the cutting tool in similar relation to the work.

4. Tracking apparatus comprising a pattern having an opaque field and a drawing in the form of a narrow light-transmitting line in said field, a movable follower member having an aperture through which the line is sighted, a work support, a cutting tool for operating on the work, a pivoted rigid member carrying the cutting tool and the follower member, the tool and follower being at different distances from the pivot according to a scale factor, the aperture being of the same shape as the operating part of said cutting tool but of different size in accordance with said scale factor, photoelectric means carried by said follower, and means controlled by the photoelectric means to move the rigid member about its pivot into a position in which a predetermined amount of light transmitted through said line falls on the photoelectric means and thereby to move the cutting tool in similar relation to the work.

5. Tracking apparatus comprising a pattern having an opaque field and a drawing in the form of a narrow light-transmitting line in said field, a movable follower member having an aperture through which the line is sighted, a work support, a cutting tool for operating on the work, a pivoted rigid member carrying the cutting tool and the follower member, the tool and follower being at different distances from the pivot according to a scale factor, the aperture being of the same shape as the operating part of said cutting tool but of different size in accordance with said scale factor, means for rotating the work and the pattern about independent axes in unison, photoelectric means carried by said follower, and means controlled by the photoelectric means to move the rigid member about its pivot into a position in which a predetermined amount of light transmitted through said line falls on the photoelectric means and thereby to move the cutting tool in similar relation to the work.

MAX KNOBEL.